Dec. 22, 1970   R. D. WOOD   3,548,587
FRICTION CONSTRUCTION FOR PLASTIC CLOCK MOVEMENT
Filed Jan. 13, 1969   2 Sheets-Sheet 1
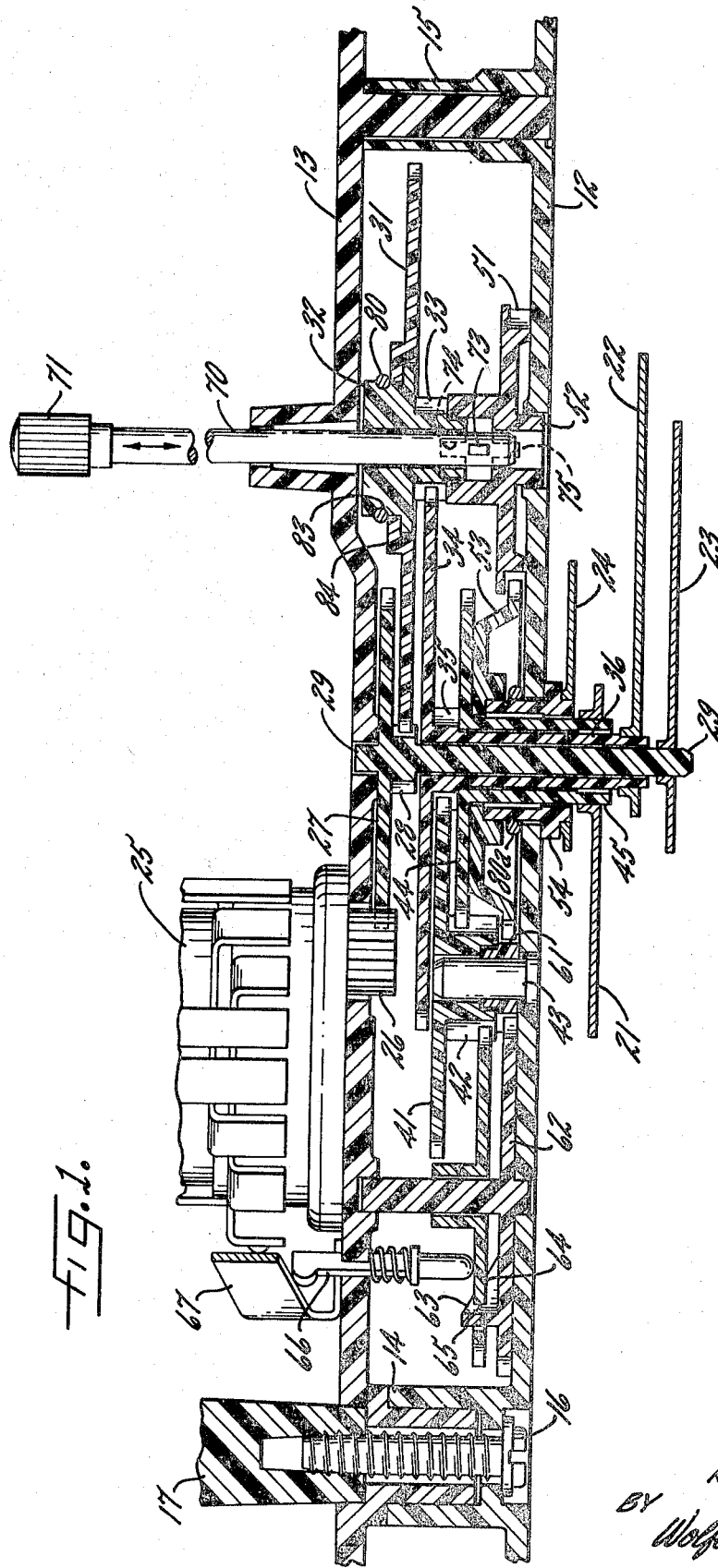
INVENTOR.
ROBERT D. WOOD,
BY Wolfe, Hubbard, Voit & Osann
ATTORNEYS.

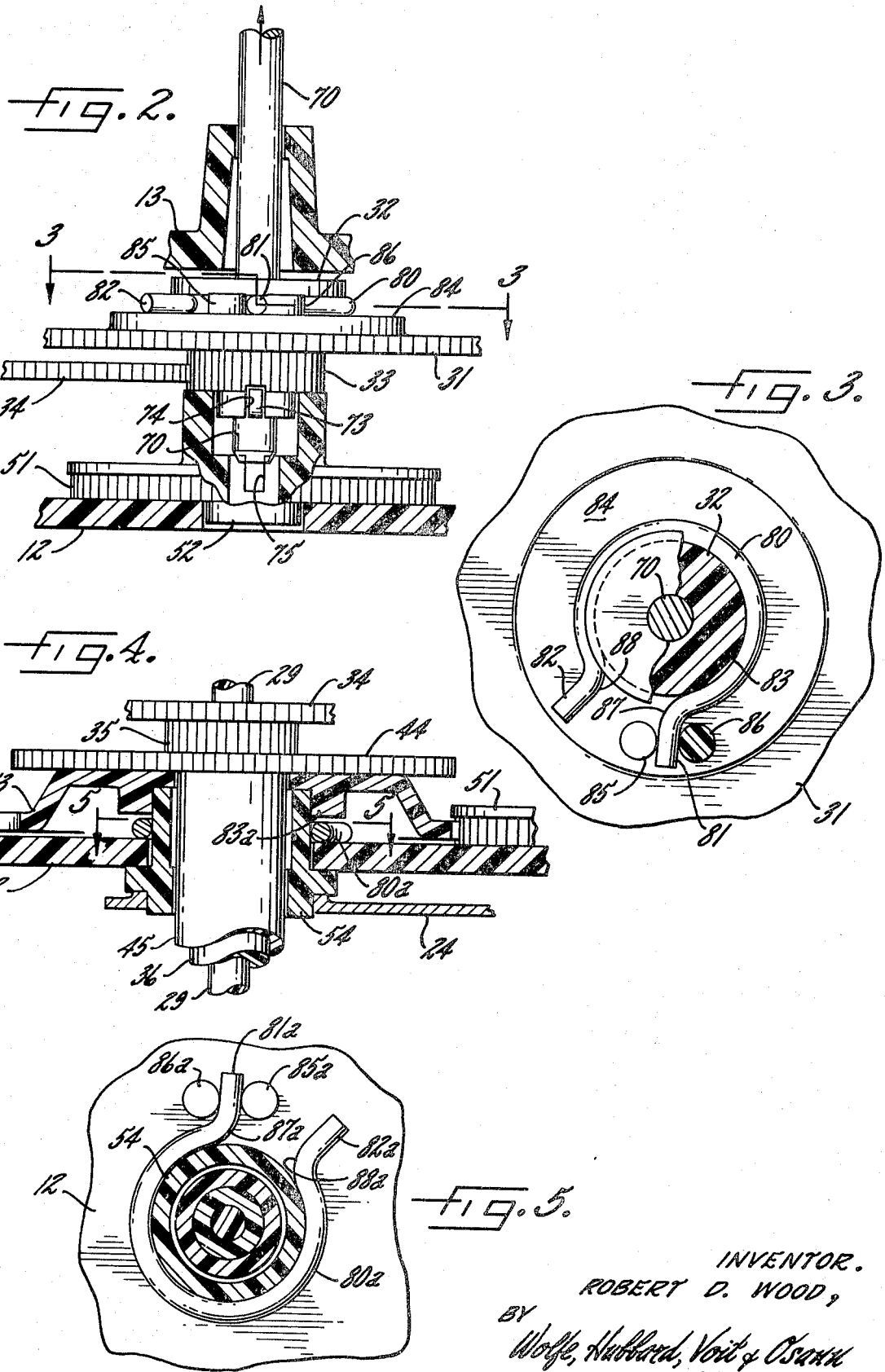

United States Patent Office 3,548,587
Patented Dec. 22, 1970

3,548,587
FRICTION CONSTRUCTION FOR PLASTIC CLOCK MOVEMENT
Robert D. Wood, Athens, Ga., assignor to General Time Corporation, Stamford, Conn., a corporation of Delaware
Filed Jan. 13, 1969, Ser. No. 790,733
Int. Cl. G04b 3/10
U.S. Cl. 58—46                    4 Claims

ABSTRACT OF THE DISCLOSURE

A friction construction for a plastic clock movement for producing frictional drag between relatively rotatable plastic elements, such that the elements are effectively connected under normal conditions but capable of being overpowered with intentional slippage under alternate conditions, as, for example, when the clock is set.

---

It is an object of the invention to provide an improved friction construction for a plastic movement producing a frictional drag between a rotatable hub member and an adjacent extensive member. It is another object to provide a friction connection which is ideally suited for friction coupling of two plastic elements, which may be used with a wide variety of plastics, which is completely free of any scraping or spalling tendency, and which indeed exerts a packing force for preserving the nature and integrity of the engaged plastic surface.

It is a more detailed object to provide a friction for a plastic clock movement which is non-symmetrically anchored but which nevertheless gives symmetrical drag characteristics in each direction free of any tendency toward binding or "wrap around" and which produces a high useful level of frictional force with relatively light parts in spite of normally encountered variations in hub diameter and regardless of whether the engaged surfaces are lubricated or non-lubricated. It is therefore an object to provide a friction which is highly economical and which may be used universally in the coupling of plastic parts in clocks and closely related devices.

Other objects and advantages of the invention will become apparent upon reading the attached detailed description and upon reference to the drawings in which:

FIG. 1 is a sectional view, in elevation, of a plastic clock mechanism incorporating the present invention;

FIG. 2 is an enlargement of a portion of the mechanism shown in FIG. 1;

FIG. 3 is a fragmentary section taken along the line 3—3 in FIG. 2;

FIG. 4 is an enlargement of another portion of the construction shown in FIG. 1; and FIG. 5 is a fragmentary transverse section taken along the line 5—5 in FIG. 4.

While the invention has been described in connection with a preferred embodiment, it will be understood that I do not intend to be limited to the particular embodiment shown, but intend to cover all of the alternatives, modifications and equivalents as may be included within the spirit and scope of the invention.

Turning now to the drawings, there is shown in FIG. 1 an alarm clock movement mounted between front and back frame plates 12, 13 spaced by integral telescoping pillar assemblies 14, 15. The pillar assembly 14 has a central opening for receiving a mounting screw 16, the tip of which is threaded into a post 17 which preferably forms a part of the housing. Projecting from the frame plate 12 is a concentric nest of shafts mounting an hour hand 21, a minute hand 22, a second hand 23 and an alarm set hand 24.

Mounted upon plate 13 is a synchronous gear motor 25 of recognized type having an output pinion 26. The pinion meshes with a seconds wheel 27 having a pinion 28 and integral shaft 29 which mounts the second hand 23. For driving the minute hand, the pinion 28 meshes with a first intermediate wheel 31 having a hub 32 and an associated pinion 33. The latter meshes with a minute wheel 34 having a pinion 35 and integral hollow shaft 36 for mounting the minute hand 22. Similarly, for driving the hour hand, a second intermediate wheel 41 is provided having a pinion 42 and mounted for rotation about a stub shaft 43. The pinion 42 is engaged by an hour wheel 44 having a hollow integral shaft 45 for mounting the hour hand 21.

In order to adjust the phasing of the alarm mechanism, and the phase positioning of the alarm set hand, an alarm set wheel 51 is provided having a hub 52 journaled in the plate 12 and meshing with an alarm set wheel 53. The latter is press-fitted onto a hollow hub 54 which mounts the alarm set hand 24 at its outer end. For the purpose of adjusting the time of sounding the alarm, the alarm wheel 53 is coupled to an idler pinion 61 which is meshed, in turn, with a cam wheel 62 having a cam 63 integrally formed on the face thereof. Mounted concentrically with the cam wheel is a drop-off wheel 64 which is meshed with the pinion 42 for rotation in unison with the hour hand, the drop-off wheel having a slot 65 for receiving the cam when the drop-off wheel is rotated around into a condition of register.

The means for sounding the alarm in response to drop-off is conventional. It may be shown, diagrammatically and in its simplest aspect, as a plunger 66, the end of which is in the path of vibrating movement of a buzzer blade 67. The buzzer blade is thus normally clamped in an inoperative position but is released upon drop-off to sound the alarm.

In accordance with the present invention a novel "friction" construction is provided, as a clutch for permitting slippage when the hands are set to the correct time, and as a brake for permitting slippage when the alarm set hand is rotated into a desired set position, both by overpowering movement of a manual setting shaft. More specifically in accordance with the invention a friction connection is provided including a hub member made of plastic which is coupled to an adjacent extensive member, which may be driven or stationary, via a C-shaped clip of spring metal of circular cross section having a normal diameter which is less than the diameter of the hub member and having its ends bent outwardly to provide a smoothly convergent nip at each end of the clip, a pair of spaced embossments being integrally formed on the adjacent extensive member for snug reception of one of the bent ends of the clip while permitting the remaining end to remain free. Thus as shown in FIGS. 1–3, the first intermediate wheel 31 and its associated hub 32 are made of separate pieces of plastic, with the wheel being telescoped over the hub and with the hub, in turn, being telescoped over a manual setting shaft 70 having a knob 71 at its outer end. At its inner end, the setting shaft 70 is provided with a dog 73 registerable with a notch 74 formed in the inner end of the hub 32 when the shaft 70 is pulled outwardly to a hand-setting position. The setting shaft is, similarly, movable to an inwardly pressed position in which the dog 73 engages a notch 75 formed in the hub 52 of the alarm set wheel 38.

For the purpose of frictionally coupling the first intermediate wheel 31 and its hub 32 for normal driving of the clock hands while permitting overpowering of the hub by the setting shaft 70, a C-shaped clip 80 of spring metal is provided having outwardly bent ends 81, 82. The clip is of circular cross section and is received in a mating groove 83 of corresponding arcuate cross section, the groove being formed in the hub closely adjacent the extensive surface 84 of the first intermediate gear. Thus when the clip is in place in the groove, the hub and gear are held captive with one another against any possibility of axial separating movement and the clip is held flatly against the gear. For the purpose of anchoring one end of the clip with respect to the surface 84 on the gear, the gear is provided with a pair of integral spaced abutments 85, 86, which are spaced apart by an amount which is just sufficient to admit the end 81 of the clip between them. The clip, in addition to being made of resilient spring metal, has a normal inner diameter which is less than that of the engaged surface so that frictional drag is developed between the clip and the surface of the groove 83, in which it is received.

In carrying out the invention the spring clip has an engaged length which extends at least about three quarters the way around the hub member but less than a full turn, and the ends of the clip are bent outwardly about a smooth curve as indicated at 87, 88 to provide convergent nips to effect a gradual change of stress at the transition region between the engaged and non-engaged portions of the hub member. In this way the hub is not subjected to any abrupt change of stress, or to any relatively sharp edge which might cause spalling of the plastic material or wear at the engaged surfaces. It is found, indeed, that there is an almost total lack of wear at the region over which the friction is generated. Notwithstanding the fact that the spring clip is non-symmetrically mounted, being held captive at only one end, and not withstanding the fact that the clip is engaged with the hub over almost a complete convolution, the friction is of the same order of magnitude regardless of the direction of rotation. Moreover, it is found that the friction is maintained at a reliably high level regardless of whether the plastic surface is operated dry or has a lubricating film. Thus there is no need to use care to maintain the surface either intentionally lubricated or intentionally dry. Friction is obtained with only reasonable pre-stress in the spring 80 using a wide variety of plastic materials, and particularly those materials which would meet the other criteria for use in a clock mechanism including reasonable hardness, dimensional stability and the like. Where the ends of the clip are bent, as shown at 87, 88, about a reasonable radius to form convergent nips extending in opposite directions, the effect is to produce a "packing" force on the plastic material so that without loss of material by spalling or the like so that the original nature and integrity of the plastic material are preserved and the characteristics are maintained constant over the life of the clock.

The invention has been found to be equally advantageous for maintaining a frictional braking force between the hub 54 upon which the alarm set hand is mounted and the adjacent extensive surface of the front frame plate 12. Thus, referring to FIGS. 4 and 5 in which corresponding reference numerals have been employed with subscript $a$, the spring clip 80$a$ having ends 81$a$, 82$a$ is mounted upon hub 54, with the ends 81$a$ of the clip being mounted between abutments 85$a$, 86$a$, which are integrally molded in the frame plate. In the case of the spring clip 80$a$, the clip is not fitted in a groove but is retained against endwise movement by a shoulder 83$a$ on the alarm wheel 53 which is force-fitted over the inner end of the hub 54. In operation, inward movement of the setting shaft 70 causes engagement between the dog 73 thereon and the registering notch 75 formed in the hub of the alarm set wheel 51. As the shaft is rotated, corresponding rotation of the alarm wheel 53, accompanied by rotation of the cam wheel 62, results in overpowering of the frictional force generated at the spring clip 80$a$ so that the hub 54 and the alarm set hand 24 are rotated around into a desired set position. When the turning effort is stopped, and the setting shaft 70 is withdrawn, the spring clip 80$a$ is fully effective to hold the hub 54, and its alarm set hand, and the cam wheel 62 as well, in the set position to await rotation of the alarm trip wheel 64 around into its position of register with respect to the cam 63 until drop-off occurs accompanied by sounding of the alarm.

Whether or not a groove, such as that shown at 83 (FIG. 3) is provided or whether the clip should be allowed to ride, substantially with line contact, on the cylindrical surface of the hub depends in part upon the amount of drag required. When the friction is used as a brake to keep the alarm set mechanism in its set phase position, relatively little frictional force is required so that the line contact suffices, but in such event separate means such as the shoulder 83$a$ is preferably used to hold the clip captive.

The clip may be made of steel, phoshor bronze or the like.

What is claimed is:

1. In a clock movement having plastic parts, the combination comprising a rotatable hub member made of plastic, an adjacent extensive member intended to be frictionally coupled to the hub member, a C-shaped clip of spring metal of circular cross section extending at least about threee quarters the way around the hub member but less than a full turn and having a normal diameter which is less than the diameter of the hub member for frictionally engaging the latter, the C-shaped clip having its ends bent outwardly to establish a smoothly convergent nip at each end of the clip to provide a packing effect and gradual change of stress at the transition region between the engaged and non-engaged portions of the hub member, and embossment means formed on the extensive member dimensioned for snug reception of one of the bent ends of the clip while permitting the remaining bent end freedom of movement with respect to the extensive member.

2. The combination as claimed in claim 1 in which the hub has a channel of arcuate cross section for engaging the circular cross section of the clip and in which the channel is located immediately adjacent the extensive member to thereby maintain the clip flatly adjacent the extensive member with the end of the clip securely nested in the embossment means.

3. The combination as claimd in claim 1 in which the hub is cylindrical and in which a shoulder is provided on the hub member closely adjacent the clip for maintaining the clip flatly seated against the extensive member to insure the engaged end of the clip remains nested in the embossment means.

4. In a clock movement having plastic parts, the combination comprising a synchronous gear motor and drive train for timed driving of a set of hands, a drive train including a first intermediate gear having a hub and an alarm trip wheel rotatable therewith, an alarm wheel having a hub and alarm set hand and having a cam wheel cooperating with the trip wheel, means responsive to rotation of the trip wheel into a condition of register with the cam wheel for sounding an alarm, a setting shaft movable axially into a time-setting position in which the setting shaft is engaged with the hub of the first intermediate wheel and a second position in which the setting shaft is coupled to the hub of the alarm wheel, said hubs each being surrounded by a C-shaped clip of spring metal of circular cross section extending at least about three-quarters the way around the hub and having a normal diameter which is less than the diameter of the hub to provide frictional engagement, said C-shaped clips each having their ends bent outwardly to establish a smoothly convergent nip at each end of the clip and having abutment means for anchoring one end of each clip for developing sliding friction against the hubs as the setting shaft is rotated in its respective axial positions.

References Cited

UNITED STATES PATENTS

| | | | |
|---|---|---|---|
| 2,574,430 | 11/1951 | Allen | 58—7 |
| 3,443,375 | 5/1969 | Cielaszyk | 58—85.5 |

FOREIGN PATENTS

| | | | |
|---|---|---|---|
| 1,000,972 | 2/1952 | France | 58—46 |

STEPHEN J. TOMSKY, Primary Examiner

L. R. FRANKLIN, Assistant Examiner

U.S. Cl. X.R.

58—85.5